United States Patent [19]

Shimizu

[11] Patent Number: 5,460,235

[45] Date of Patent: Oct. 24, 1995

[54] ELECTRICALLY OPERATED POWER STEERING APPARATUS

[75] Inventor: Yasuo Shimizu, Saitama, Japan

[73] Assignee: Honda Giken Kogyo Kabushiki Kaisha, Tokyo, Japan

[21] Appl. No.: 359,628

[22] Filed: Dec. 20, 1994

[30] Foreign Application Priority Data

Dec. 20, 1993 [JP] Japan ................................. 5-320197

[51] Int. Cl.$^6$ ........................................................ B62D 5/04
[52] U.S. Cl. .................... 180/79.1; 318/434; 364/424.05
[58] Field of Search ........................... 180/79.1; 318/434; 364/424.05

[56] References Cited

U.S. PATENT DOCUMENTS

| | | | |
|---|---|---|---|
| 4,730,686 | 3/1988 | Shimizu | 180/79.1 |
| 5,086,859 | 2/1992 | Takahashi et al. | 180/79.1 |
| 5,238,079 | 8/1993 | Gorim | 180/79.1 |
| 5,398,953 | 3/1995 | Shimizu | 180/79.1 |

FOREIGN PATENT DOCUMENTS 0460406  5/1991  European Pat. Off. .

62-238165  10/1987  Japan .

*Primary Examiner*—Mitchell J. Hill
*Attorney, Agent, or Firm*—Armstrong, Westerman, Hattori, McLeland & Naughton

[57] ABSTRACT

An electrically operated power steering apparatus for applying an assistive steering force to a steering system has an electric motor for producing an assistive steering force to be applied to the steering system, a steering torque sensor for producing a steering torque signal indicative of a steering torque of the steering system, and a rotational speed sensor for producing a rotational speed signal indicative of a rotational speed of the electric motor. A controller produces a differential signal of the steering torque signal, calculates a steering rotational speed of the steering system based on the differential signal and the rotational speed signal, and controls the electric motor based on the steering torque signal and the steering rotational speed. The rotational speed signal may be calculated based on a motor current signal indicative of a motor current of the electric motor and a motor voltage signal indicative of a motor voltage of the electric motor.

5 Claims, 4 Drawing Sheets

ELECTRICALLY OPERATED POWER STEERING APPARATUS

BACKGROUND OF THE INVENTION

1. Field of the Invention

The present invention relates to an electrically operated power steering apparatus for applying the power of an electric motor as an assistive steering force to a mechanical steering system to reduce the manual force required to steer a motor vehicle which incorporates such an electrically operated power steering apparatus.

2. Description of the Prior Art

There has been known an electrically operated power steering apparatus which comprises a steering torque sensor for detecting the steering torque of a steering system, a steering rotational speed sensor for detecting the steering rotational speed of the steering system, and a controller for determining a motor control signal to control an electric motor to generate an assistive steering force, on the basis of an output signal from the steering torque sensor and an output signal from the steering rotational speed sensor. One example of the known electrically operated power steering apparatus is disclosed in Japanese laid-open patent publication No. 62-238165 which corresponds to U.S. Pat. No. 4,730,686.

FIG. 4 of the accompanying drawings schematically shows in block form a conventional control system for controlling an electrically operated power steering apparatus which is incorporated in a motor vehicle. When a steering wheel coupled to a steering shaft is angularly moved by the driver of the motor vehicle, a steering torque sensor 13 detects a steering torque corresponding to the manual steering force applied by the driver, and outputs a steering torque signal T indicative of the detected steering torque to a controller 15.

A steering rotational speed sensor 14 detects a steering rotational speed corresponding to the speed at which the steering shaft rotates, and outputs a steering rotational speed signal θ' indicative of the detected steering rotational speed to the controller 15.

Based on the steering torque signal T and the steering rotational speed signal θ which are supplied, the controller 15 generates a motor control signal Do and supplies the motor control signal Do to a motor driver 16.

The controller 15 has a torque control quantity generator for generating a motor control quantity $D_T$ corresponding to the steering torque signal T and a rotational speed control quantity generator for generating a motor control quantity $D_N$ corresponding to the steering rotational speed signal θ'. The controller 15 produces the motor control signal Do by adding, subtracting, or combining the motor control quantity $D_T$ and the motor control quantity $D_N$. The motor control signal Do is applied to control the motor driver 16 to energize an electric motor 11 with a motor drive signal Mo. The electric motor 11 produces an assistive steering force which is applied reduce manual steering forces required to steer the motor vehicle.

In the conventional control system, the steering rotational speed sensor is associated with the steering shaft for directly detecting a steering rotational speed and outputting a steering rotational speed signal θ' representing the detected steering rotational speed.

The steering rotational speed sensor combined with the steering shaft comprises a photoelectric transducer or a generator, and hence occupies a relatively large space around the steering shaft. Therefore, the steering rotational speed sensor poses a space limitation which makes it difficult to meet demands for a wider foot space in front of the driver's seat for better driving maneuverability.

Recent motor vehicles incorporate various other mechanisms in combination with the steering shaft for better steering operation. Such mechanisms include a tilt mechanism for allowing the steering wheel to be tilted to a desired angle and a telescopic mechanism for adjusting the distance between the driver and the steering wheel. Since these mechanisms are mounted on the steering shaft, considerable efforts are required to make a layout in which to assemble the steering rotational speed sensor and these mechanisms neatly in a limited space on and around the steering shaft.

SUMMARY OF THE INVENTION

It is therefore an object of the present invention to provide an electrically operated power steering apparatus which is devoid of any steering rotational speed sensor in combination with a steering shaft, thus reducing the number of parts used, and can calculate a signal corresponding to a steering rotational speed for producing desired assistive steering forces.

According to the present invention, there is provided an electrically operated power steering apparatus for applying an assistive steering force to a steering system, comprising an electric motor for producing an assistive steering force to be applied to the steering system, a steering torque sensor for detecting a steering torque of the steering system, a rotational speed sensor for detecting a rotational speed of the electric motor, and control means for controlling the electric motor, the control means comprising steering rotation detecting means for detecting a rotational speed of the steering system, and motor control means for controlling the electric motor based on the steering torque detected by the steering torque sensor and the rotational speed detected by the steering rotation detecting means, the steering rotation detecting means comprising steering torque differentiating means for differentiating the steering torque detected by the steering torque sensor, and steering rotational speed determining means for determining the rotational speed of the steering system based on the differentiated steering torque and the rotational speed detected by the rotate speed sensor.

According to the present invention, there is also provided an electrically operated power steering apparatus for applying an assistive steering force to a steering system, comprising an electric motor for producing an assistive steering force to be applied to the steering system, a steering torque sensor for detecting a steering torque of the steering system, motor current detecting means for detecting a motor current of the electric motor, motor voltage detecting means for detecting a motor voltage of the electric motor, and control means for controlling the electric motor, the control means comprising steering rotation detecting means for detecting a rotational speed of the steering system, and motor control means for controlling the electric motor based on the steering torque detected by the steering torque sensor and the rotational speed detected by the steering rotation detecting means, the steering rotation detecting means comprising steering torque differentiating means for differentiating the steering torque detected by the steering torque sensor, and steering rotational speed determining means for determining the rotational speed of the steering system based on the differentiated steering torque, the motor current detected by the motor current detecting means, and the motor voltage detected by the motor voltage detecting means.

According to the present invention, there is further provided an electrically operated power steering apparatus for applying an assistive steering force to a steering system, comprising an electric motor for producing an assistive steering force to be applied to the steering system, a steering torque sensor for producing a steering torque signal indicative of a steering torque of the steering system, rotational speed detecting means for producing a rotational speed signal indicative of a rotational speed of the electric motor, and control means for producing a differential signal of the steering torque signal, calculating a steering rotational speed of the steering system based on the differential signal and the rotational speed signal, and controlling the electric motor based on the steering torque signal and the steering rotational speed. The control means may calculate the rotational speed signal based on a motor current signal indicative of a motor current of the electric motor and a motor voltage signal indicative of a motor voltage of the electric motor.

According to the present invention, there is further provided an electrically operated power steering apparatus for applying an assistive steering force to a steering system, comprising an electric motor for producing an assistive steering force to be applied to the steering system, a steering torque sensor for producing a steering torque signal indicative of a steering torque of the steering system, rotational speed detecting means for producing a rotational speed signal indicative of a rotational speed of the electric motor, motor current detecting means for producing a motor current signal indicative of a motor current of the electric motor, motor voltage detecting means for producing a motor voltage signal indicative of a motor voltage of the electric motor, and control means for producing a differential signal of the steering torque signal, calculating a steering rotational speed of the steering system based on the differential signal, the motor current signal, and the motor voltage signal, and controlling the electric motor based on the steering torque signal and the steering rotational speed.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
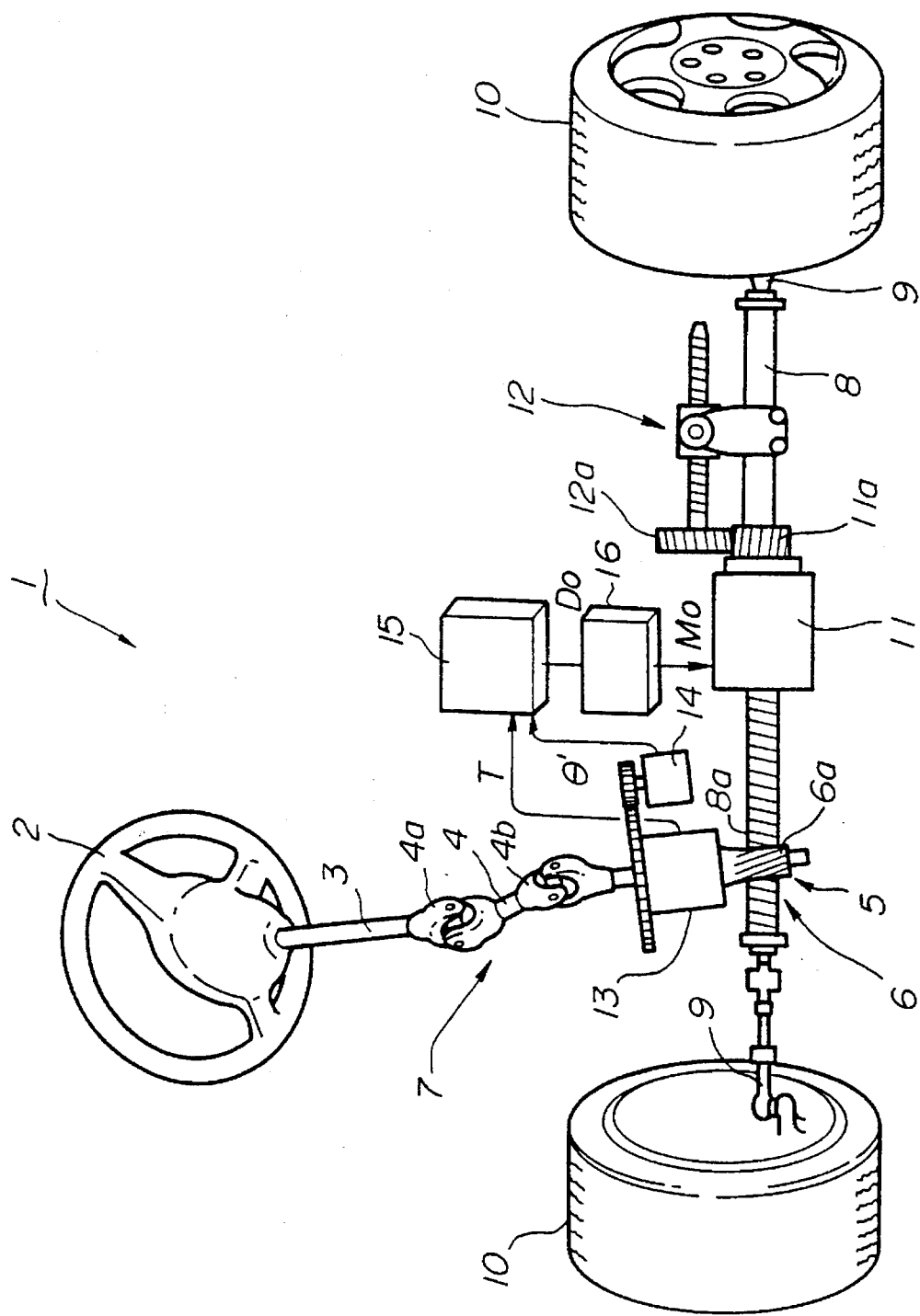
FIG. 1 is a perspective view of the mechanical structure of a conventional electrically operated power steering apparatus according to the present invention.

An electrically operated power steering apparatus according to the present invention has a mechanical structure shown in FIG. 1.

As shown in FIG. 1, the electrically operated power steering apparatus, generally denoted at 1, has a manual steering force generating means 7 composed of a steering shaft 3 integral with a steering wheel 2, and a steering gearbox 5 operatively coupled to the steering shaft 3 through a coupling shaft 4 having universal joints 4a, 4b, the steering gearbox 5 having a rack and pinion mechanism 6.

The rack and pinion mechanism 6 has a pinion 6a meshing with rack teeth 8a of a reciprocally movable rack shaft 8 having opposite ends coupled through respective tie rods 9 to steerable front left and right wheels 10.

When the steering wheel 2 is turned, the rack and pinion mechanism 6 is operated to turn the front wheels 10 to steer a motor vehicle which incorporates the electrically operated power steering apparatus 1.

In order to reduce manual steering forces produced by the manual steering force generating means 7, an electric motor 11 for generating assistive steering forces is disposed coaxially with the rack shaft 8. An assistive steering force generated by the electric motor 11 is converted by a ball screw mechanism 12 extending parallel to the rack shaft 8 into a thrust force which is applied to the rack shaft 8.

A drive helical gear 11a is integrally joined to a rotor (not shown) of the electric motor 11, and held in mesh with a driven helical gear 12a coupled coaxially to an end of the screw shaft of the ball screw mechanism 12. The ball screw mechanism 12 has a nut connected to the rack shaft 8.

The steering gearbox 5 has a steering torque sensor 13 for detecting a manual torque acting on the pinion 6a. A steering rotational speed sensor 14 is associated with the steering shaft 3 for detecting a steering rotational speed corresponding to the rotational speed of the steering shaft 3. The steering torque sensor 13 and the steering rotational speed sensor 14 supply a steering torque signal T and a steering rotational speed signal θ', respectively, to a control means 15.

The steerable front wheels 10 are mechanically connected to the steering wheel 2. The control means 15 processes a signal representing a combination of the steering torque signal T produced by the steering torque sensor 13 and the steering rotational speed signal θ' produced by the steering rotational speed sensor 14, thereby to produce a motor control signal Do, e.g., a PWM (pulse-width-modulation) signal, to enable a motor driving means 16, which may comprise a bridge circuit of FETs, for example, to output a motor drive signal Mo to energize the electric motor 11 in a PWM mode for producing assistive steering forces depending on the angular movement of the steering wheel 1.

Figure 2:
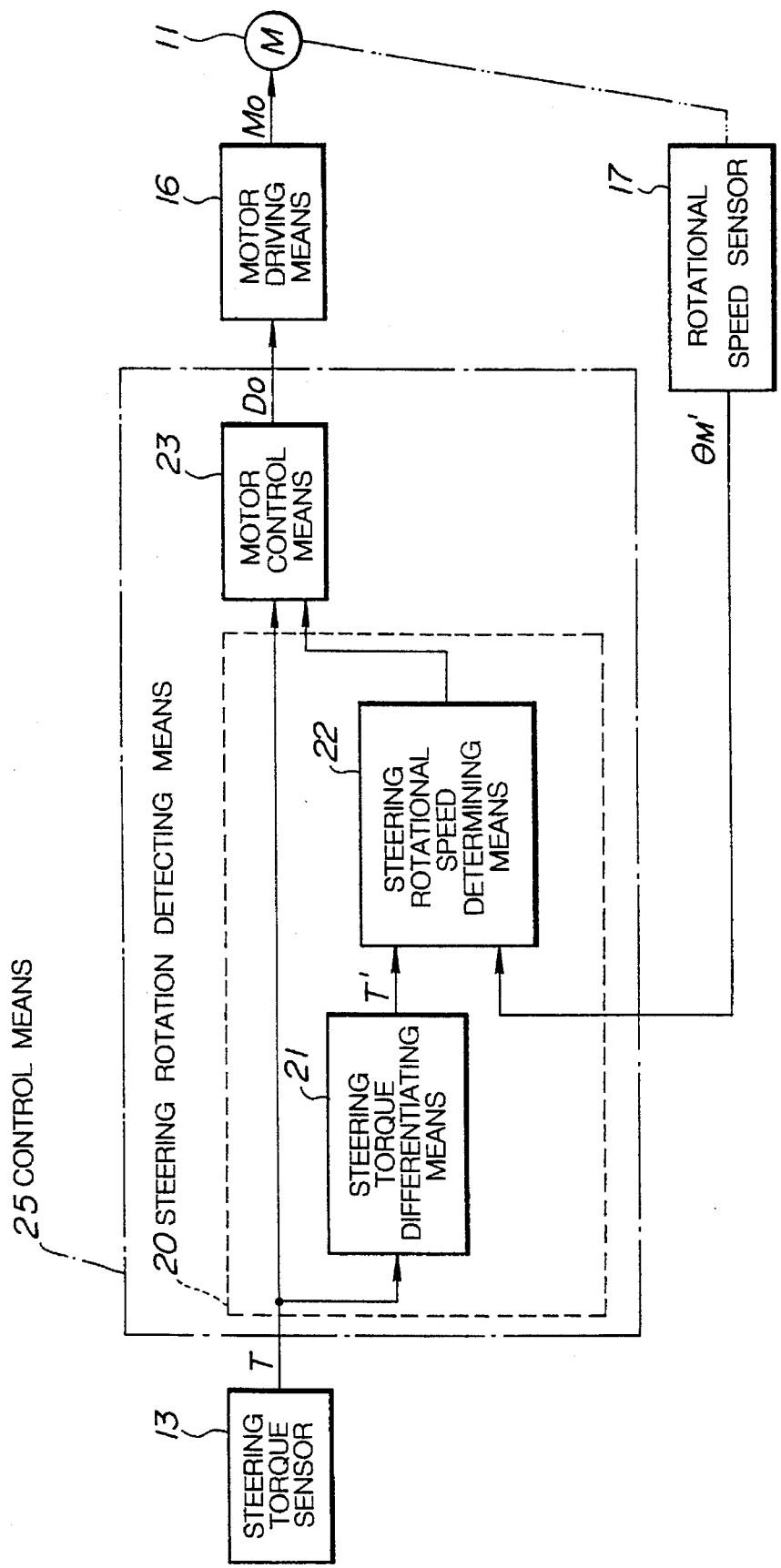
FIG. 2 is a block diagram of a control system according to an embodiment of the present invention for controlling the electrically operated power steering apparatus.

FIG. 2 shows a control system according to an embodiment of the present invention for controlling the electrically operated power steering apparatus 1. The control system includes an electric motor 11, a steering torque sensor 13, a motor driving means 16, a rotational speed sensor 17, and a control means 25. The electric motor 11, the steering torque sensor 13, and the motor driving means 16 correspond to those shown in FIG. 1.

The rotational speed sensor 17 detects a rotational speed of the electric motor 11 and produces a rotational speed signal $\theta_M'$ representative of the detected rotational speed.

The control means 25 basically comprises a microprocessor, and includes a steering rotation detecting means 20 for calculating a steering rotational speed θ' and a motor control means 23 for controlling the motor driving means 16.

The steering rotation detecting means 20 calculates a steering rotational speed from a steering torque signal T supplied from the steering torque sensor 13 and a rotational speed signal $\theta_M'$ from the rotational speed sensor 17, and outputs a steering rotational speed $\theta'$ representative of the calculated steering rotational speed.

Figure 4:
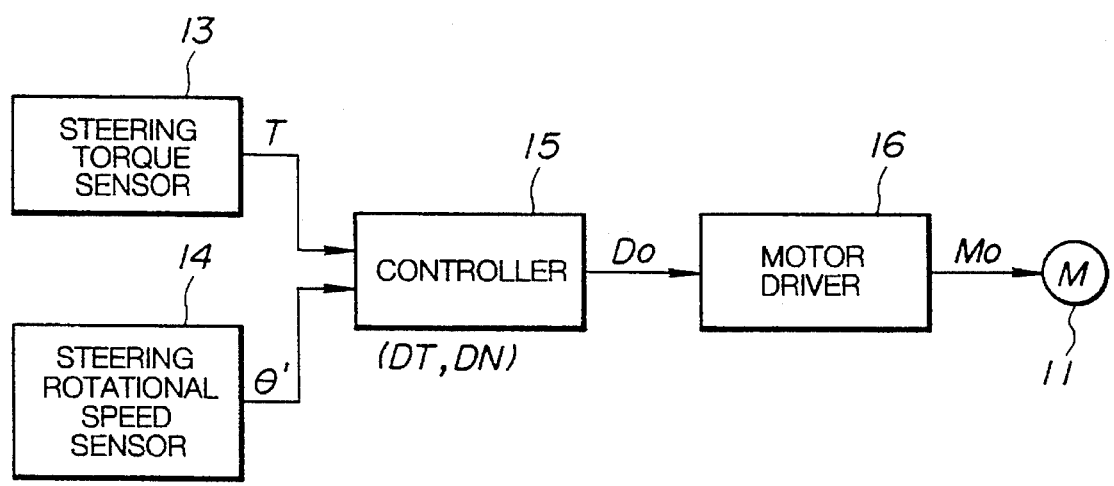
FIG. 4 is a block diagram of a conventional control system for controlling an electrically operated power steering apparatus.

Based on the steering torque signal T and the steering rotational speed signal $\theta'$ which are supplied, the motor control means 23 generates a motor control signal Do, which may be a PWM signal composed of the motor control quantity $D_T$ and the motor control quantity $D_N$ as shown in FIG. 4, and supplies the motor control signal Do to the motor driving means 16. In response to the motor control signal Do, the motor driving means 16 supplies a motor drive signal Mo to the electric motor 11 to energize the electric motor 11 to produce a desired assistive steering force.

The steering rotation detecting means 20 comprises a steering torque differentiating means 21 and a steering rotational speed determining means 22.

The steering torque differentiating means 21 may comprise, for example, a filter and an adder/subtractor implemented by a processing program executed by the microprocessor. The steering torque differentiating means 21 differentiates the steering torque signal T (dT/dt), and supplies a differential signal T' to the steering rotational speed determining means 22.

The steering rotational speed determining means 22 may comprise an adder, a divider, and a memory such as a read-only memory (ROM), and calculates a steering rotational speed signal $\theta'$ based on the differential signal T', the rotational speed signal $\theta_M'$, and a spring constant $K_T$ stored in the memory.

The relationship between a steering torque T of the steering shaft 3, a steering rotational displacement $\theta$ of the steering shaft 3, and a rotational displacement $\theta_M$ of the electric motor 11 is generally expressed by a dynamic model (not shown) according to the following equation (1):

$$T = k_T * (\theta - \theta_M). \tag{1}$$

By differentiating both sides of the equation (1) with respect to time, the following equation (2) is obtained:

$$T' = k_T * (\theta' - \theta_M') \tag{2}$$

where T'=dT/dt, $\theta'$=d$\theta$/dt, and $\theta_M'$=d$\theta_M$/dt.

The equation (2) is solved for a steering rotational speed $\theta$ according to the following equation (3):

$$\theta' = (T'/k_T) + \theta_M' \tag{3}$$

The right-hand side of the equation (3) is calculated by the steering rotational speed determining means 22 to calculate the steering rotational speed $\theta'$.

As described above, the steering rotation detecting means 20 of the control means 25 differentiates a steering torque signal T to produce a differential signal T', and calculates a steering rotational speed $\theta'$ based on a rotational speed signal $\theta_M'$ and the differential signal T'. Therefore, the electrically operated power steering apparatus controlled by the control system shown in FIG. 1 can produce a desired assistive steering force corresponding to the steering rotational speed $\theta'$ without any steering rotational speed sensor.

Figure 3:
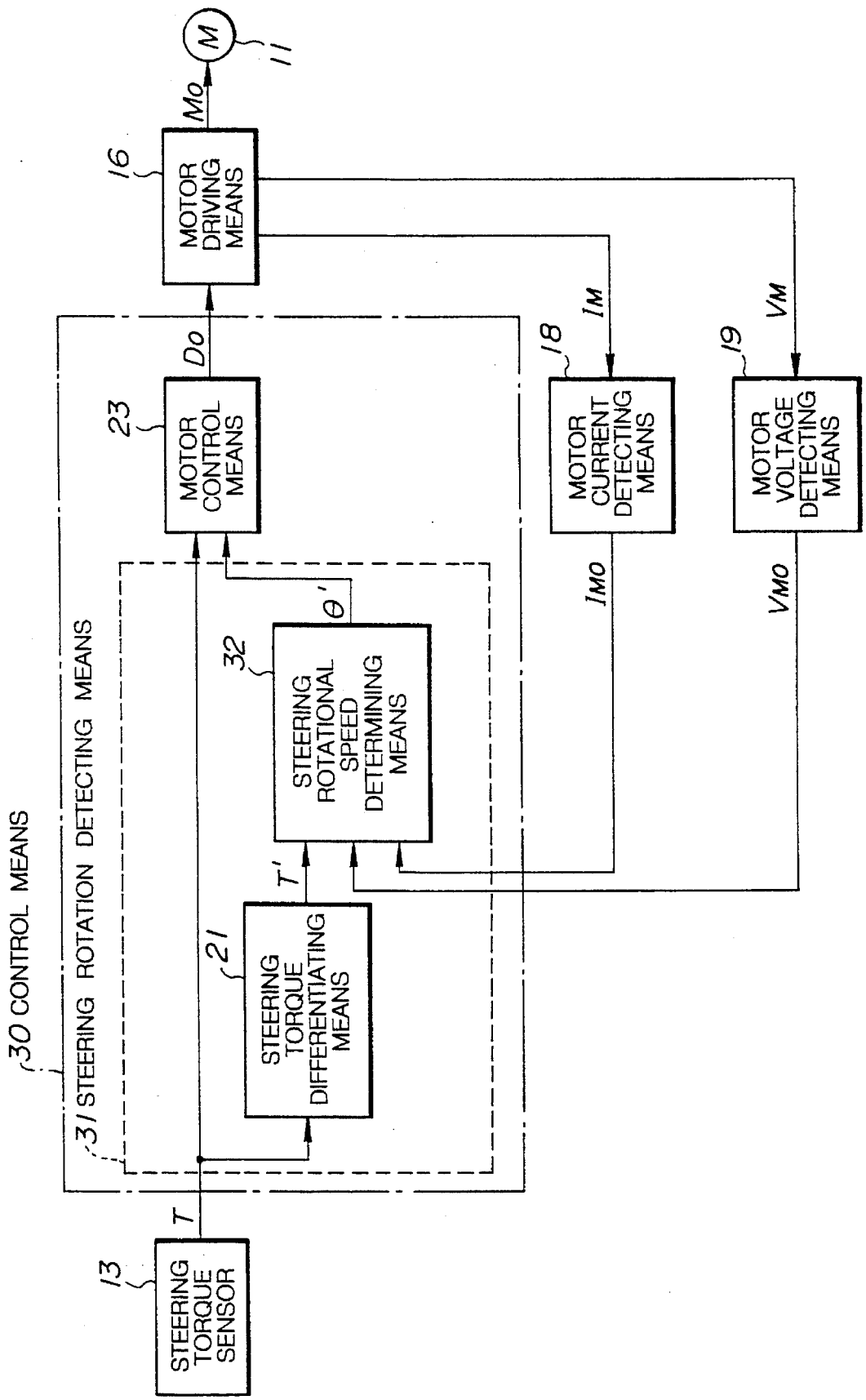
FIG. 3 is a block diagram of a control system according to another embodiment of the present invention for controlling the electrically operated power steering apparatus.

FIG. 3 shows in block form a control system according to another embodiment of the present invention for controlling the electrically operated power steering apparatus. The control system shown in FIG. 3 includes an electric motor 11, a steering torque sensor 13, a motor driving means 16, a motor current detecting means 18, a motor voltage detecting means 19, and a control means 30. The electric motor 11, the steering torque sensor 13, and the motor driving means 16 correspond to those shown in FIG. 2.

The motor current detecting means 18 detects a current $I_M$ of the electric motor 11 and produces a current signal $I_{MO}$ representative of the detected current $I_M$. The motor voltage detecting means 19 detects a voltage VM of the electric motor 11 and produces a voltage signal $V_{MO}$ representative of the detected voltage $V_M$.

The control means 30 basically comprises a microprocessor, and includes a steering rotation detecting means 31 for calculating a steering rotational speed $\theta'$ and a motor control means 23 for controlling the motor driving means 16.

The steering rotation detecting means 31 calculates a steering rotational speed from a steering torque signal T supplied from the steering torque sensor 13, a motor current signal $I_{MO}$ supplied from the motor current detecting means 18, and a motor voltage signal $V_{MO}$ supplied from the motor voltage detecting means 19, and outputs a steering rotational speed $\theta'$ representative of the calculated steering rotational speed.

Based on the steering torque signal T and the steering rotational speed signal $\theta$ which are supplied, the motor control means 23 generates a motor control signal Do, and supplies the motor control signal Do to the motor driving means 16. In response to the motor control signal Do, the motor driving means 16 supplies a motor drive signal Mo to the electric motor 11 to energize the electric motor 11 to produce a desired assistive steering force.

The steering rotation detecting means 31 comprises a steering torque differentiating means 21 and a steering rotational speed determining means 32.

The steering torque differentiating means 21 differentiates the steering torque signal T (dT/dt), and supplies a differential signal T' to the steering rotational speed determining means 32.

The steering rotational speed determining means 32 may comprise an adder, a subtractor, a multiplier, a divider, and a memory such as a ROM. The steering rotational speed determining means 32 calculates a steering rotational speed signal $\theta'$ based on the differential signal T', the motor current signal $I_{MO}$, and the motor voltage signal $V_{MO}$, a spring constant $k_T$, a resistance $R_M$ of the electric motor 11, and an inductance $L_M$ of the electric motor 11 which are stored in the memory.

The steering rotational speed determining means 32 has a calculating means for calculating a rotational speed $\theta M'$ of the electric motor 11, in addition of the calculating means, described above, of the steering rotational speed determining means 22 shown in FIG. 2.

Using the resistance $R_M$, the inductance $L_M$, and an induced voltage constant k, the relationship between the motor voltage $V_M$, the motor current $I_M$, and the rotational speed $\theta_M'$ of the electric motor 11 is generally expressed by the following equation (4):

$$\begin{aligned} V_M &= L_M * I_M' + R_M * I_M + k * \theta_M' \\ &= R_M * I_M + k * \theta_M' \end{aligned} \tag{4}$$

where $I_M' = dI_M/dt$, $L_M * I_M' = 0$.

From the equation (4), the rotational speed $\theta_M'$ of the electric motor 11 is determined according to the following equation (5):

$$\theta_M' = (V_M - R_M * I_M)/k. \tag{5}$$

By eliminating $\theta_M'$ from the equations (3), (5), a steering rotational speed $\theta'$ relative to the differential signal T', the motor voltage $V_M$, and the motor current $I_M$ is obtained according to the following equation (6):

$$\theta' = T'/k_T + ((V_M - R_M * I_M)/k. \tag{6}$$

The steering rotational speed determining means 32 first determines a rotational speed $\theta_M'$ of the electric motor 11 according to the equation (5), and then determines a steering rotational speed $\theta'$ according to the equation (3) using the determined rotational speed $\theta_M'$.

Alternatively, the steering rotational speed determining means 32 may calculate a steering rotational speed $\theta'$ according to the equation (6).

The above equations (4), (5), and (6) use the motor voltage $V_M$ and the motor current IM. However, the motor voltage signal $V_{MO}$ and the motor current signal $I_{MO}$ which correspond respectively to the motor voltage $V_M$ and the motor current $I_M$ may be used to calculate the steering rotational speed $\theta'$.

As described above, the steering rotation detecting means 31 of the control means 30 differentiates a steering torque signal T to produce a differential signal T', and calculates a steering rotational speed $\theta'$ based on a motor voltage signal $V_{MO}$, a motor current signal $I_{MO}$, and the differential signal T'. Therefore, the electrically operated power steering apparatus controlled by the control system shown in FIG. 2 can produce a desired assistive steering force corresponding to the steering rotational speed $\theta''$ without any steering rotational speed sensor and any rotational speed sensor.

Since the electrically operated power steering apparatus shown in FIG. 2 requires no steering rotational speed sensor and the electrically operated power steering apparatus shown in FIG. 3 requires no steering rotational speed sensor and no rotational speed sensor, the number of parts of these electrically operated power steering apparatus is reduced, thereby increasing a space on and around the steering shaft for giving the driver a wider foot space and accommodating other mechanisms in combination with the steering shaft in a simpler layout.

Although certain preferred embodiments of the present invention has been shown and described in detail, it should be understood that various changes and modifications may be made therein without departing from the scope of the appended claims.

What is claimed is:

1. An electrically operated power steering apparatus for applying an assistive steering force to a steering system, comprising:

an electric motor for producing an assistive steering force to be applied to the steering system;

a steering torque sensor for detecting a steering torque of the steering system;

a rotational speed sensor for detecting a rotational speed of said electric motor; and control means for controlling said electric motor;

said control means comprising:

steering rotation detecting means for detecting a rotational speed of the steering system; and motor control means for controlling said electric motor based on the steering torque detected by said steering torque sensor and the rotational speed detected by said steering rotation detecting means;

said steering rotation detecting means comprising:

steering torque differentiating means for differentiating the steering torque detected by said steering torque sensor; and steering rotational speed determining means for determining said rotational speed of the steering system based on the differentiated steering torque and the rotational speed detected by said rotational speed sensor.

2. An electrically operated power steering apparatus for applying an assistive steering force to a steering system, comprising:

an electric motor for producing an assistive steering force to be applied to the steering system;

a steering torque sensor for detecting a steering torque of the steering system;

motor current detecting means for detecting a motor current of said electric motor;

motor voltage detecting means for detecting a motor voltage of said electric motor; and control means for controlling said electric motor;

said control means comprising:

steering rotation detecting means for detecting a rotational speed of the steering system; and motor control means for controlling said electric motor based on the steering torque detected by said steering torque sensor and the rotational speed detected by said steering rotation detecting means;

said steering rotation detecting means comprising:

steering torque differentiating means for differentiating the steering torque detected by said steering torque sensor; and steering rotational speed determining means for determining said rotational speed of the steering system based on the differentiated steering torque, the motor current detected by said motor current detecting means, and the motor voltage detected by said motor voltage detecting means.

3. An electrically operated power steering apparatus for applying an assistive steering force to a steering system, comprising:

an electric motor for producing an assistive steering force to be applied to the steering system;

a steering torque sensor for producing a steering torque signal indicative of a steering torque of the steering system;

rotational speed detecting means for producing a rotational speed signal indicative of a rotational speed of said electric motor; and control means for producing a differential signal of said steering torque signal, calculating a steering rotational speed of the steering system based on said differential signal and said rotational speed signal, and controlling said electric motor based on said steering torque signal and said steering rotational speed.

4. An electrically operated power steering apparatus according to claim 3, wherein said control means includes means for calculating said rotational speed signal based on a motor current signal indicative of a motor current of said electric motor and a motor voltage signal indicative of a motor voltage of said electric motor.

5. An electrically operated power steering apparatus for applying an assistive steering force to a steering system, comprising:

an electric motor for producing an assistive steering force to be applied to the steering system;

a steering torque sensor for producing a steering torque signal indicative of a steering torque of the steering system;

rotational speed detecting means for producing a rotational speed signal indicative of a rotational speed of said electric motor;

motor current detecting means for producing a motor current signal indicative of a motor current of said electric motor;

motor voltage detecting means for producing a motor voltage signal indicative of a motor voltage of said electric motor; and control means for producing a differential signal of said steering torque signal, calculating a steering rotational speed of the steering system based on said differential signal, said motor current signal, and said motor voltage signal, and controlling said electric motor based on said steering torque signal and said steering rotational speed.

* * * * *